United States Patent
Kurihara

(10) Patent No.: US 11,299,196 B2
(45) Date of Patent: *Apr. 12, 2022

(54) FAILURE DETECTION DEVICE AND ELECTRIC POWER STEERING APPARATUS

(71) Applicant: Showa Corporation, Gyoda (JP)

(72) Inventor: Hiroaki Kurihara, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 187 days.

This patent is subject to a terminal disclaimer.

(21) Appl. No.: 16/598,379

(22) Filed: Oct. 10, 2019

(65) Prior Publication Data

US 2020/0039574 A1    Feb. 6, 2020

Related U.S. Application Data

(63) Continuation-in-part of application No. PCT/JP2017/020490, filed on Jun. 1, 2017.

(30) Foreign Application Priority Data

May 26, 2017    (JP) ............................ JP2017-104589

(51) Int. Cl.
 *B62D 5/04*    (2006.01)
(52) U.S. Cl.
 CPC .......... *B62D 5/049* (2013.01); *B62D 5/0463* (2013.01)
(58) Field of Classification Search
 CPC .............................. B62D 5/049; B62D 5/0463
 See application file for complete search history.

(56) References Cited

U.S. PATENT DOCUMENTS

| 4,660,671 A * | 4/1987 | Behr ...................... B62D 5/049 180/446 |
| 6,041,884 A * | 3/2000 | Shimizu ................. B62D 1/166 180/443 |
| 6,381,526 B1 * | 4/2002 | Higashi ................... G01L 3/102 180/443 |

(Continued)

FOREIGN PATENT DOCUMENTS

| DE | 60307361 T2 | 8/2007 |
| DE | 102007058078 A1 | 6/2009 |

(Continued)

OTHER PUBLICATIONS

International Search Report dated Aug. 8, 2017 for the corresponding PCT International Application No. PCT/JP2017/020490.

(Continued)

*Primary Examiner* — Jacob D Knutson
(74) *Attorney, Agent, or Firm* — Leason Ellis LLP

(57) ABSTRACT

The failure detection device includes: a failure detection unit configured to detect failure of a torque detection unit, the torque detection unit detecting torque applied to a rotary shaft with plural torque sensors; and a controller configured to control drive of a motor such that the motor outputs continuous torque in an event that the failure detection unit detects failure of the torque detection unit, the continuous torque continuously generating torque that is, if at least one of the plural torque sensors is working properly, detectable by the at least one of the plural torque sensors.

18 Claims, 10 Drawing Sheets

(56) References Cited

U.S. PATENT DOCUMENTS

| | | | |
|---|---|---|---|
| 6,386,052 B1 * | 5/2002 | Satoh | G01L 3/109 |
| | | | 73/862.333 |
| 6,397,969 B1 * | 6/2002 | Kasai | B62D 5/0481 |
| | | | 180/404 |
| 2003/0217607 A1 | 11/2003 | Tokumoto et al. | |
| 2005/0223820 A1 | 10/2005 | Murakami et al. | |
| 2007/0205041 A1 * | 9/2007 | Nishizaki | B62D 5/0472 |
| | | | 180/446 |
| 2010/0299027 A1 | 11/2010 | Aoki | |
| 2011/0232988 A1 * | 9/2011 | Aoki | G01L 25/003 |
| | | | 180/446 |
| 2012/0031202 A1 * | 2/2012 | Goto | B62D 5/049 |
| | | | 73/862.193 |
| 2016/0059886 A1 * | 3/2016 | Tsunoda | B62D 5/049 |
| | | | 701/43 |
| 2016/0167701 A1 * | 6/2016 | Sone | G01L 3/12 |
| | | | 701/43 |
| 2016/0200352 A1 * | 7/2016 | Kezobo | H02P 21/20 |
| | | | 180/446 |
| 2020/0198690 A1 * | 6/2020 | Kurihara | B62D 5/049 |

FOREIGN PATENT DOCUMENTS

| | | | |
|---|---|---|---|
| DE | 102009005836 A1 | 7/2010 | |
| JP | 62-228920 | 10/1987 | |
| JP | 2000238655 A * | 9/2000 | B62D 5/046 |
| JP | 2005-300267 | 10/2005 | |
| JP | 2010-132253 | 6/2010 | |
| JP | 2012-218646 | 11/2012 | |
| JP | 2016-022787 | 2/2016 | |
| WO | WO-2015/071974 | 5/2015 | |

OTHER PUBLICATIONS

German Office Action dated Feb. 1, 2022 for the corresponding German Patent Application No. 112017007588.2.

* cited by examiner

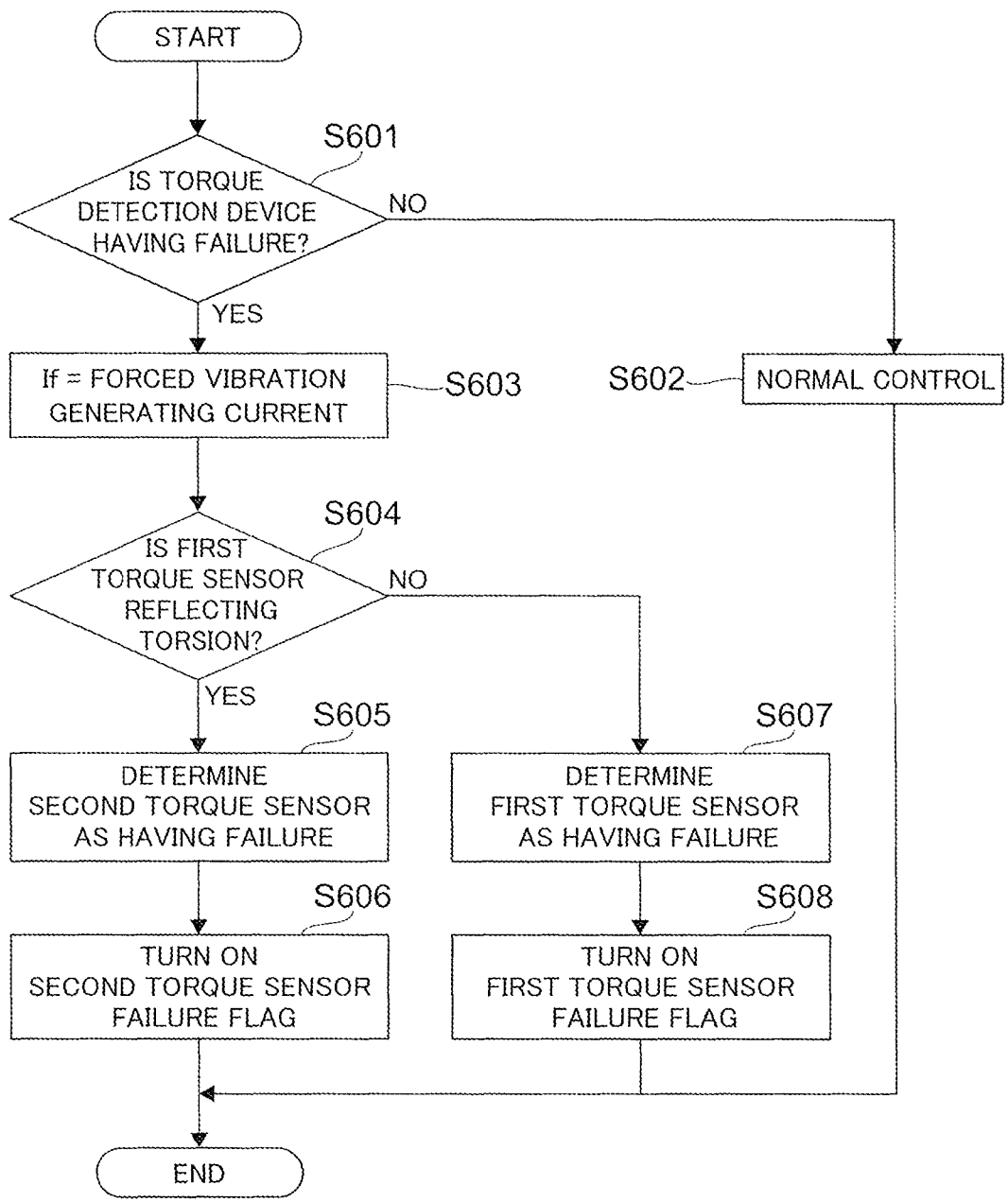

FAILURE DETECTION DEVICE AND ELECTRIC POWER STEERING APPARATUS

CROSS-REFERENCE TO RELATED APPLICATIONS

This application is a continuation-in-part of PCT application No. PCT/JP2017/020490 filed on Jun. 1, 2017, which claims for priority of Japanese Patent Application No. 2017-104589 filed on May 26, 2017, the contents of which are incorporated herein by reference.

FIELD OF THE INVENTION

The present invention relates to a failure detection device and an electric power steering apparatus.

BACKGROUND OF THE INVENTION

For example, Japanese Patent Application Laid-Open Publication No. 2005-300267 discloses a torque detection device incorporated in an electric power steering apparatus. The torque detection device includes two magnetosensitive elements each composed of a hall element whose electric properties (resistance) vary under the effect of a magnetic field. The two magnetosensitive elements each function as a sensor to detect torque applied to an input shaft (rotary shaft).

Technical Problem

To stably and accurately detect steering torque, it is preferable that at least two torque sensors be provided. This is because use of two torque sensors each capable of detecting steering torque allows to accurately determine that the two torque sensors are working properly by comparing output values from the two torque sensors. On the other hand, when one of the two torque sensors is having failure, it is difficult to accurately determine that the other of the two torque sensors is working properly. In that case, a torque value detected by the other of the two torque sensors may be unreliable.

Desirably, the electric power steering apparatus continues a motor assistance even after failure of one of two torque sensors in order to reduce a burden on a driver. For this reason, it is preferable that a torque sensor can be determined to be working properly even when this torque sensor is the only one torque sensor working properly. This allows the electric power steering apparatus to continue a motor assistance based on output values from the other of the two torque sensors even after failure of one of the two torque sensors.

An object of the present invention is to provide a failure detection device and an electric power steering apparatus each of which allows to determine a torque sensor to be working properly even when this torque sensor is the only one torque sensor working properly.

SUMMARY OF THE INVENTION

Solution to Problem

With the above object in view, the present invention is a failure detection device including: a failure detection unit configured to detect failure of a torque detection unit, the torque detection unit detecting torque applied to a rotary shaft with plural torque sensors; and a controller configured to control drive of a motor such that the motor outputs continuous torque in an event that the failure detection unit detects failure of the torque detection unit, the continuous torque continuously generating torque that is, if at least one of the plural torque sensors is working properly, detectable by the at least one of the plural torque sensors.

Advantageous Effects of Invention

According to the present invention, it is possible to determine a torque sensor to be working properly even when this torque sensor is the only one torque sensor working properly.

BRIEF DESCRIPTION OF THE DRAWINGS

FIG. 6 is a flowchart of an assist control process executed by the controller.

DETAILED DESCRIPTION OF THE INVENTION

Embodiments of the present invention will be described in detail below with reference to the attached drawings.

First Embodiment

Figure 1:
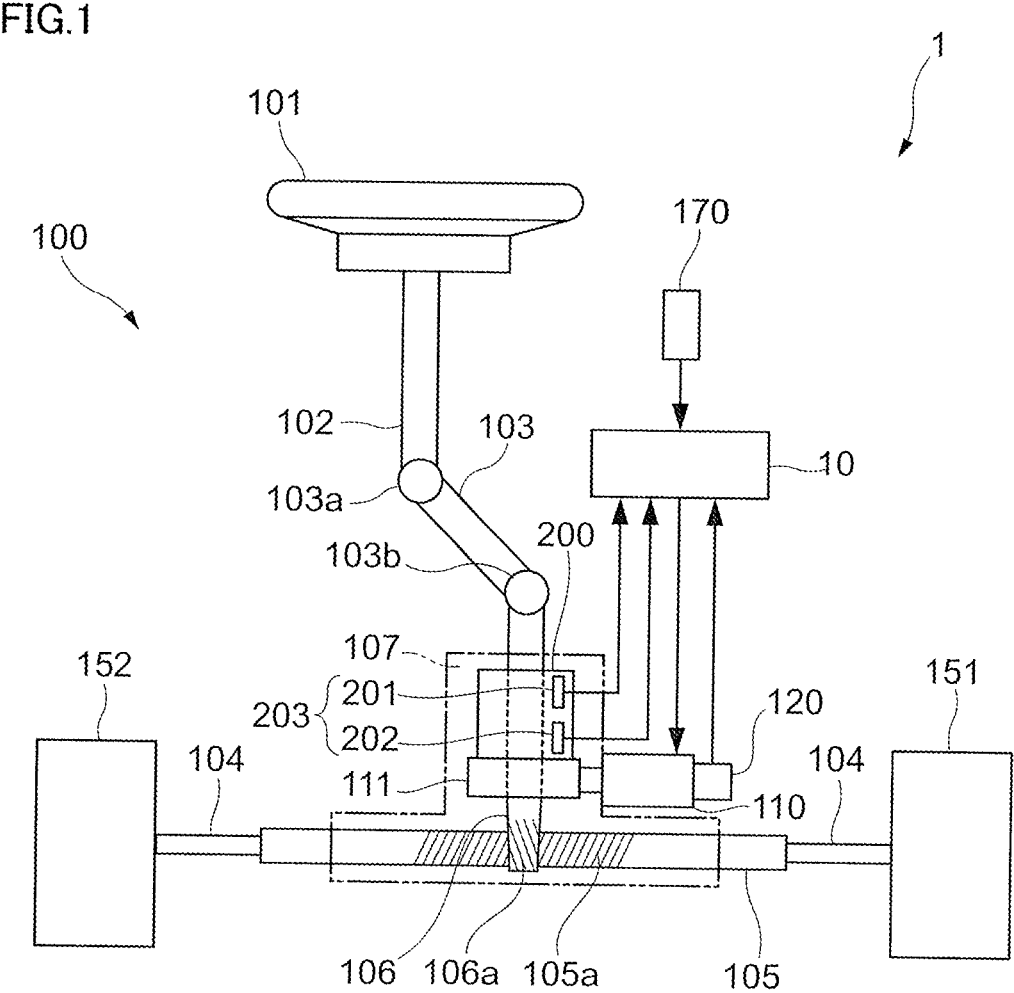
FIG. 1 depicts a schematic configuration of an electric power steering apparatus according to the first embodiment.

FIG. 1 depicts a schematic configuration of an electric power steering apparatus 100 according to the first embodiment.

The electric power steering apparatus 100 (hereinafter may be simply referred to as the "steering apparatus 100") is a steering apparatus to change a traveling direction of a vehicle to any direction. By way of example, the steering apparatus 100 of the present embodiment is used in an automobile 1, which is an example of the vehicle. FIG. 1 illustrates the automobile 1 when viewed from the front.

The steering apparatus 100 includes a wheel-like steering wheel (handle) 101 operated by a driver to change a traveling direction of the automobile 1, and a steering shaft 102 integral with the steering wheel 101. The steering apparatus 100 further includes a coupling shaft 103 coupled with the steering shaft 102 via a universal joint 103a, and a pinion shaft 106 coupled with the coupling shaft 103 via a universal joint 103b. The pinion shaft 106 rotates along with rotation of the steering wheel 101. The pinion shaft 106 includes a pinion 106a at its lower end.

The steering apparatus 100 further includes a tie rod 104 coupled with a left front wheel 151 and a right front wheel 152 as rolling wheels, and a rack shaft 105 coupled with the tie rod 104. Rack teeth 105a formed on the rack shaft 105 and a pinion 106a formed on the pinion shaft 106 constitute a rack and pinion mechanism.

The steering apparatus 100 further includes a torque detection device 200 that detects steering torque T applied to the steering wheel 101 on the basis of torsion degree of the pinion shaft 106. The torque detection device 200 includes a first torque sensor 201 and a second torque sensor 202. For example, each of the first torque sensor 201 and the second torque sensor 202 is a magnetostrictive sensor that detects the steering torque T according to the torsion degree of the pinion shaft 106, on the basis of changes in magnetic properties due to magnetostriction. To allow the first torque sensor 201 and the second torque sensor 202 to detect the steering torque T, the pinion shaft 106 includes a magnetostrictive film on its outer surface. The first torque sensor 201 and the second torque sensor 202 may be other known torque sensors using hall ICs or MR elements. Hereinafter, the first torque sensor 201 and the second torque sensor 202 may be collectively referred to as "torque sensors 203".

The steering apparatus 100 further includes: a steering gearbox 107 containing the pinion shaft 106; an electric motor 110 supported by the steering gearbox 107; and a deceleration mechanism 111 that decelerates rotation of the electric motor 110 before transmitting it to the pinion shaft 106. For example, the deceleration mechanism 111 may consist of a worm wheel (not shown in the figure) fixed to the pinion shaft 106 and a worm gear (not shown in the figure) fixed to an output shaft of the electric motor 110. The electric motor 110 applies a rotary force to the pinion shaft 106, thereby applying a driving force (rack force) to the rack shaft 105, which in turn causes the left front wheel 151 and the right front wheel 152 to roll. The electric motor 110 of the present embodiment is a three-phase brushless motor including a resolver 120 that outputs a rotational angle signal θms depending on a motor rotational angle θm, which is a rotational angle of the electric motor 110.

The steering apparatus 100 further includes a controller 10 to control operation of the electric motor 110. The controller 10 receives output signals from the aforementioned torque detection device 200. Via a network (CAN) for communication of signals to control various apparatuses installed on the automobile 1, the controller 10 also receives other signals including an output signal v from a vehicle speed sensor 170 that detects a vehicle speed Vc, which is a travelling speed of the automobile 1.

The steering apparatus 100 configured as above drives the electric motor 110 on the basis of the steering torque T detected by the torque detection device and transmits the driving force (generated torque) of the electric motor 110 to the pinion shaft 106. The generated torque of the electric motor 110 thus assists the driver in steering the steering wheel 101. That is, the electric motor 110 applies an assist force to the driver's steering of the steering wheel 101.

(Controller)

An explanation will be given of the controller 10.

Figure 2:
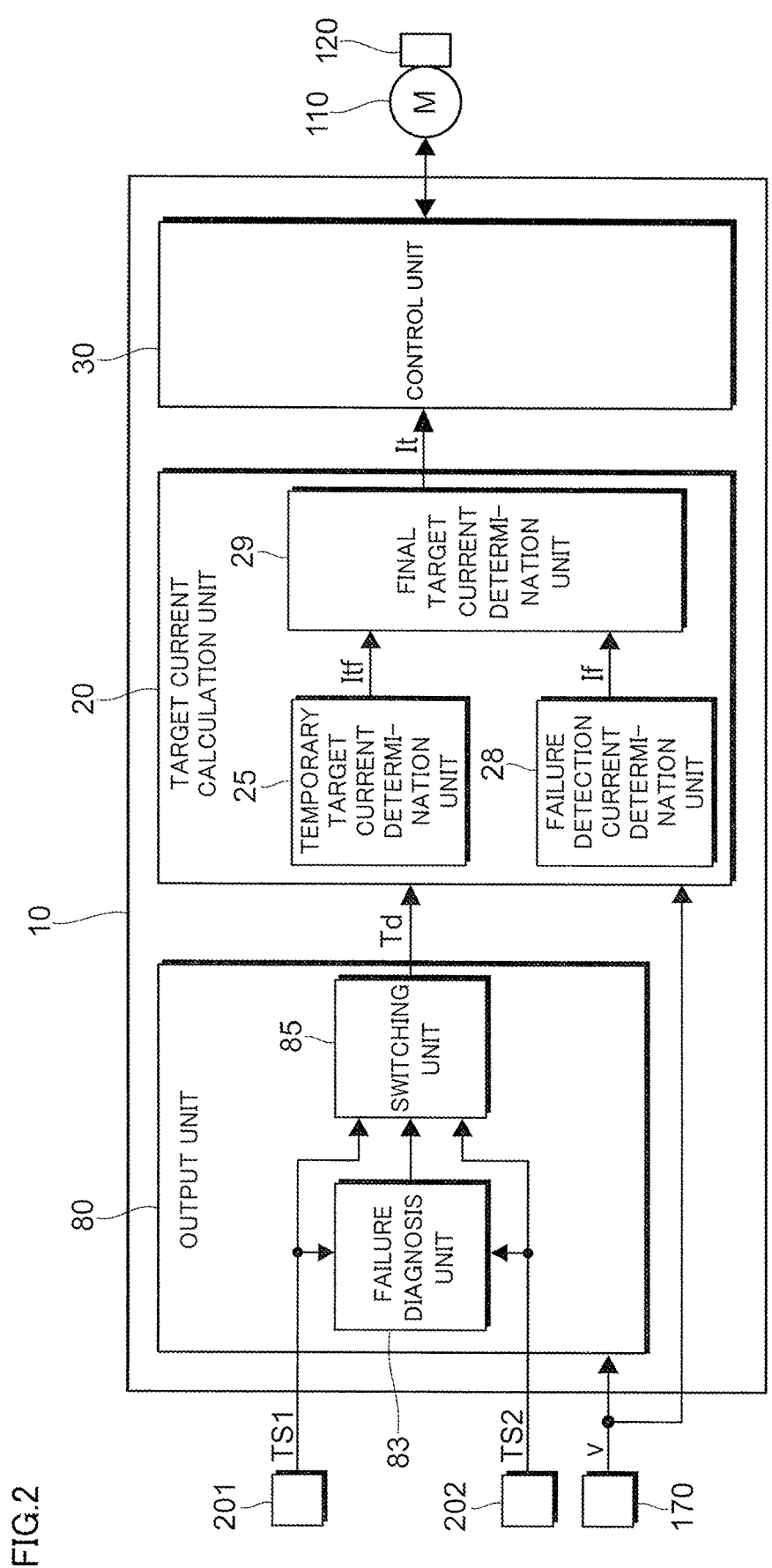
FIG. 2 depicts a schematic configuration of a controller.

FIG. 2 depicts a schematic configuration of the controller 10.

The controller 10 is an arithmetic logical unit consisting of a CPU, a ROM, a RAM, a backup RAM etc.

The controller 10 receives input of various signals including a first torque detection signal TS1 from the aforementioned first torque sensor 201, a second torque detection signal TS2 from the second torque sensor 202, and the vehicle speed signal v, which corresponds to the vehicle speed Vc, from the vehicle speed sensor 170.

The controller 10 includes a target current calculation unit 20 and a control unit 30. The target current calculation unit 20 calculates (sets) a target current It to be supplied to the electric motor 110. The control unit 30 performs various controls including a feedback control based on the target current It calculated by the target current calculation unit 20.

The controller 10 further includes an output unit 80. On the basis of the first torque detection signal TS1 from the first torque sensor 201 or the second torque detection signal TS2 from the second torque sensor 202, the output unit 80 outputs a value in accordance with the steering torque and also diagnoses failure of the torque detection device 200.

[Target Current Calculation Unit]

The target current calculation unit 20 includes a temporary target current determination unit 25, a failure detection current determination unit 28, and a final target current determination unit 29. The temporary target current determination unit 25 determines a temporary target current Itf, which is temporarily determined. The failure detection current determination unit 28 determines a failure detection current If depending on whether the output unit 80 has detected failure of the torque detection device 200 or not. The final target current determination unit 29 determines the target current It finally supplied to the electric motor 110.

The target current calculation unit 20 receives input of a torque signal Td (described later) from the output unit 80 and the output signal from the vehicle speed sensor 170 depending on the vehicle speed Vc.

The temporary target current determination unit 25 determines the temporary target current Itf on the basis of the torque signal Td and the output signal v from the vehicle speed sensor 170. By way of example, when the steering torque T is positive, the temporary target current Itf is positive, and when the steering torque T is negative, the temporary target current Itf is negative. A dead zone range may also be set. At a given absolute value of the steering torque T, an absolute value of the temporary target current Itf increases with decrease in the vehicle speed Vc.

The failure detection current determination unit 28 will be described in detail later.

In the absence of notification from the output unit 80 that both of the first torque sensor 201 and the second torque sensor 202 are having failure, the final target current determination unit 29 determines the final target current It to be the sum of the temporary target current Itf determined by the temporary target current determination unit 25 and the failure detection current If determined by the failure detection current determination unit 28. On the other hand, in response to the notification from the output unit 80 that both of the first torque sensor 201 and the second torque sensor 202 are having failure, the final target current determination unit 29 determines the target current It to be zero.

The target current calculation unit 20 performs various processing when the temporary target current determination unit 25, the failure detection current determination unit 28, and the final target current determination unit 29 obtain output values from the output unit 80 and various sensors including the vehicle speed sensor 170 for every predetermined period (e.g., 1 millisecond), and the target current calculation unit 20 calculates the target current It accordingly for every predetermined period.

The output unit 80 obtains output values from the torque detection device 200 and performs various processing on the output values for every predetermine period (e.g., 1 millisecond), and outputs various signals for every predetermined period, including the torque signal Td and a signal informing that the torque detection device 200 is having failure.

Here, the state where a torsion amount of the pinion shaft 106 is zero is defined as a neutral state (neutral position), and a direction in which the torsion of the pinion shaft 106 changes during the steering wheel 101 being turned to the right from the neutral state (neutral position) is defined as a positive direction (i.e., the steering torque T is defined to be positive). Also, a direction in which the torsion of the pinion shaft 106 changes during the steering wheel 101 being turned to the left from the neutral state is defined as a negative direction (i.e., the steering torque T is defined to be negative).

Basically, when the steering torque T detected by the torque detection device 200 is positive, the temporary target current Itf is calculated so as to turn the electric motor 110 to the right, and a flow direction of this temporary target current Itf is defined as a positive flow direction. That is, basically, when the steering torque T is positive, the temporary target current determination unit 25 determines a positive temporary target current Itf to generate torque that causes the electric motor 110 to turn to the right. When the steering torque T is negative, the temporary target current determination unit 25 determines a negative temporary target current Itf to generate torque that causes the electric motor 110 to turn to the left.

[Control Unit]

The control unit 30 includes: a motor drive control unit (not shown in the figure) to control operation of the electric motor 110; a motor driving unit (not shown in the figure) to drive the electric motor 110; and a motor current detection unit (not shown in the figure) to detect an actual current Im actually flowing to the electric motor 110.

The motor drive control unit includes a feedback (F/B) controller (not shown in the figure) and a PWM signal generator (not shown in the figure). The feedback controller performs feedback control on the basis of deviation between the target current It finally determined by the target current calculation unit 20 and the actual current Im to the electric motor 110 detected by the motor current detection unit. The PWM signal generator generates a pulse width modulation (PWM) signal to PWM-drive the electric motor 110.

The feedback controller includes a deviation calculator (not shown in the figure) and a feedback (F/B) processor (not shown in the figure). The deviation calculator calculates the deviation between the target current It finally determined by the target current calculation unit 20 and the actual current Im detected by the motor current detection unit. The feedback processor performs a feedback process to null the deviation.

On the basis of the output value from the feedback controller, the PWM signal generator generates a PWM signal to PWM-drive the electric motor 110, and outputs the generated PWM signal.

The motor driving unit is a so-called inverter, and includes for example six independent transistors (FETs) as switching elements. Out of the six transistors, three transistors are connected between a positive electrode line of a power source and an electric coil of each phase, and the other three transistors are connected between a negative electrode (earth) line and the electric coil of each phase. Gates of two transistors selected from the six transistors are driven to enable switching operation of the two transistors, whereby driving of the electric motor 110 is controlled.

The motor current detection unit detects a value of the actual current Im flowing to the electric motor 110, on the basis of voltages at both ends of a shunt resistor connected to the motor driving unit.

[Output Unit]

The output unit 80 includes a failure diagnosis unit 83 to diagnose failure of the first torque sensor 201 and the second torque sensor 202. The output unit 80 further includes a switching unit 85. On the basis of the diagnosis results from the failure diagnosis unit 83, the switching unit 85 switches which one of the following is used as the torque signal Td, namely: a first torque detection signal TS1 output from the first torque sensor 201; and a second torque detection signal TS2 output from the second torque sensor 202.

<<Failure Diagnosis Unit>>

The failure diagnosis unit 83 receives input of the first torque detection signal TS1 from the first torque sensor 201 and the second torque detection signal TS2 from the second torque sensor 202. On the basis of the first torque detection signal TS1 and the second torque detection signal TS2, the failure diagnosis unit 83 diagnoses whether the first torque sensor 201 or the second torque sensor 202 is having failure. Further, when the first torque sensor 201 is having failure, the failure diagnosis unit 83 diagnoses whether the second torque sensor 202 is having failure, on the basis of the second torque detection signal TS2. When the second torque sensor 202 is having failure, the failure diagnosis unit 83 diagnoses whether the first torque sensor 201 is having failure, on the basis of the first torque detection signal TS1. The failure diagnosis method will be described in detail later.

<<Switching Unit>>

When the failure diagnosis unit 83 determines that neither the first torque sensor 201 nor the second torque sensor 202 is having failure, the switching unit 85 outputs a signal to that effect and also outputs the first torque detection signal TS1 from the first torque sensor 201 as the torque signal Td.

When the failure diagnosis unit 83 determines that the second torque sensor 202 is having failure, the switching unit 85 outputs a signal to that effect and also outputs the first torque detection signal TS1 from the first torque sensor 201 as the torque signal Td.

When the failure diagnosis unit 83 determines that the first torque sensor 201 is having failure, the switching unit 85 outputs a signal to that effect and also outputs the second torque detection signal TS2 from the second torque sensor 202 as the torque signal Td.

When the failure diagnosis unit 83 determines that both of the first torque sensor 201 and the second torque sensor 202 are having failure, the switching unit 85 outputs a signal to that effect.

[Failure Diagnosis]

Below a description will be given of the failure diagnosis by the failure diagnosis unit 83.

Figure 3:
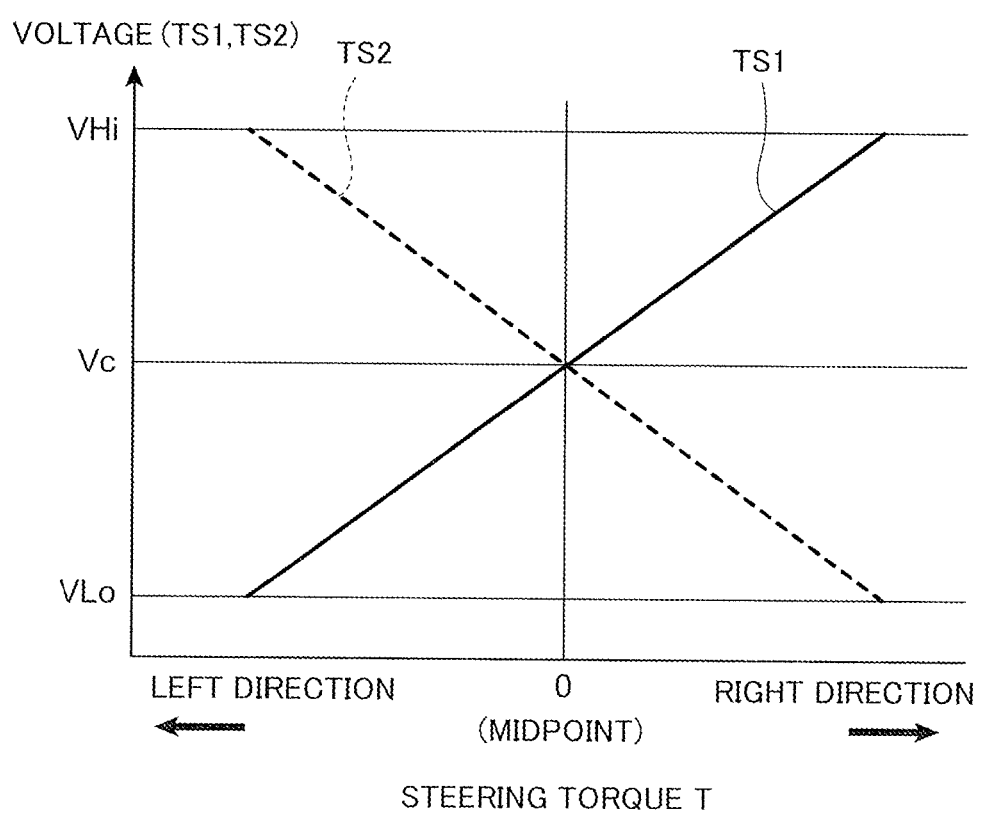
FIG. 3 depicts an output range of first and second torque detection signals.

FIG. 3 depicts an output range of the first torque detection signal TS1 and the second torque detection signal TS2. Hereinafter, the first torque detection signal TS1 and the second torque detection signal TS2 may be collectively referred to as a "torque detection signal TS".

As shown in FIG. 3, the first torque detection signal TS1 increases with increase in the steering torque T in the right direction, and varies between the maximum voltage VHi and the minimum voltage VLo. As shown in FIG. 3, the second torque detection signal TS2 increases with increase in the steering torque T in the left direction, and varies between the maximum voltage VHi and the minimum voltage VLo. For example, the maximum voltage VHi is 4.5V, and the minimum voltage VLo is 0.5V.

Figure 4:
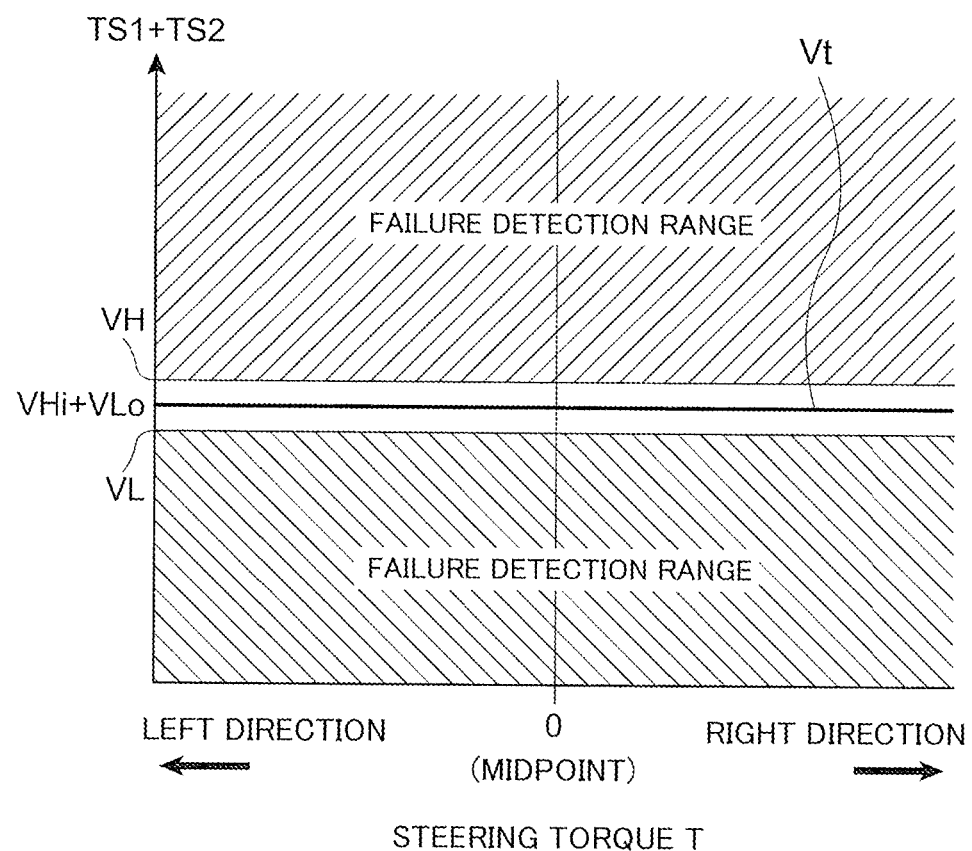
FIG. 4 depicts a failure detection range of a torque detection device.

FIG. 4 depicts a failure detection range of the torque detection device 200.

When the torque detection device 200 is having failure, it falls within failure detection ranges shown in FIG. 4. Examples of failure of the torque detection device 200 include stuck-open or stuck-closed failure in the circuit, disconnection, and signal fault.

When both of the first torque sensor 201 and the second torque sensor 202 are working properly, the total voltage Vt of the first torque detection signal TS1 and the second torque detection signal TS2 is always at a predetermined voltage (VHi+VLo) (see the solid line in FIG. 4).

When the total voltage Vt of the first torque detection signal TS1 and the second torque detection signal TS2 falls within a predetermined range around the predetermined voltage (VHi+VLo), the failure diagnosis unit 83 determines that both of the first torque sensor 201 and the second torque sensor 202 are working properly and thus the torque detection device 200 is working properly. On the other hand, when the total voltage Vt is out of the predetermined range, the failure diagnosis unit 83 determines that the first torque sensor 201 or the second torque sensor 202 is having failure and thus the torque detection device 200 is having failure. For example, the predetermined range is a range from a lower limit reference value VL, which is lower than the predetermined voltage (VHi+VLo), to an upper limit reference value VH, which is higher than the predetermined voltage (VHi+VLo).

Upon receipt of the signal from the output unit 80 to the effect that neither of the first torque sensor 201 nor the second torque sensor 202 is having failure (in other words, without the signal to the effect that the torque detection device 200 is having failure), the failure detection current determination unit 28 sets the failure detection signal If to zero. On the other hand, upon receipt of the signal from the output unit 80 to the effect that the first torque sensor 201 or the second torque sensor 202 is having failure, the failure detection current determination unit 28 determines the failure detection current If to be a forced vibration generating current by which the electric motor 110 generates vibrations. For example, the forced vibration generating current is a current periodically and sinusoidally varying between positive and negative values.

When the torque detection device 200 is working properly, namely when both of the first torque sensor 201 and the second torque sensor 202 are working properly, the failure detection current determination unit 28 of the above configured controller 10 sets the failure detection signal If to zero. As a result, the target current calculation unit 20 determines the temporary target current Itf determined by the temporary target current determination unit 25 to be the final target current It.

On the other hand, when the torque detection device 200 is having failure, namely when at least one of the first torque sensor 201 and the second torque sensor 202 is having failure, the failure detection current determination unit 28 determines the forced vibration generating current to be the failure detection current If. As a result, the target current calculation unit 20 determines a current that is the sum of the temporary target current Itf determined by the temporary target current determination unit 25 and the failure detection current If (forced vibration generation current) to be the final target current It.

Hereinafter, driving control of the electric motor 110 performed by the controller 10 when the torque detection device 200 is working properly is referred to as a "normal control", and driving control of the electric motor 110 performed by the controller 10 when the torque detection device 200 is having failure is referred to as an "at-failure control".

During the at-failure control, adding the failure detection current If to the temporary target current Itf causes periodic torsion of the pinion shaft 106. This torsion is due to driving torque of the electric motor 110 corresponding to the failure detection current If (forced vibration generating current). Thus, when the torque sensors 203 are working properly, the sensors 203 detect the periodic torsion of the pinion shaft 106 caused by the failure detection current If (forced vibration generating current). On the other hand, when the torque sensors 203 are having failure, the sensors 203 cannot detect the periodic torsion of the pinion shaft 106 caused by the failure detection current If (forced vibration generating current).

In view of this, the failure diagnosis unit 83 of the output unit 80 determines that, when the signal obtained from the torque sensors 203 reflects the periodic torsion of the pinion shaft 106 caused by the failure detection current If (forced vibration generating current), the torque sensors 203 are working properly. When the signal obtained from the torque sensors 203 does not reflect this periodic torsion of the pinion shaft 106, the failure diagnosis unit 83 determines that the torque sensors 203 are having failure.

Figure 5A:
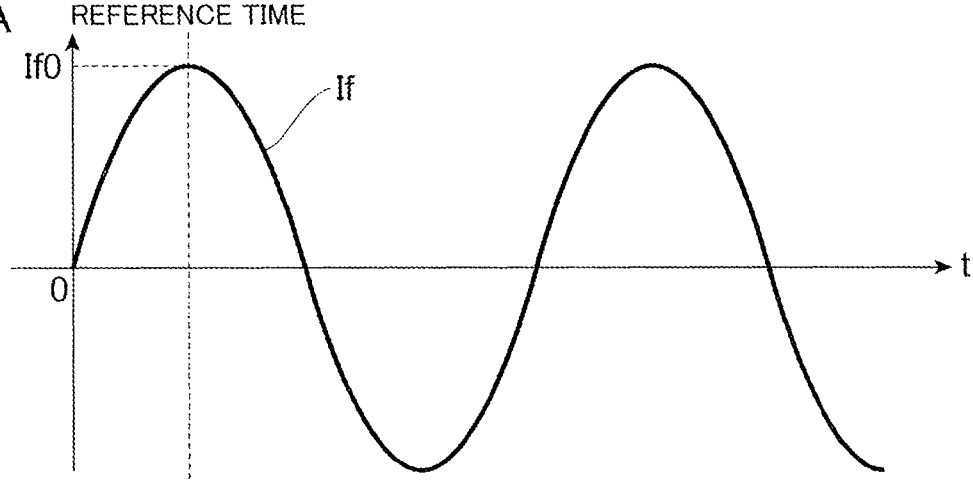
FIG. 5A depicts a target current during an at-failure control being executed.
Figure 5B:
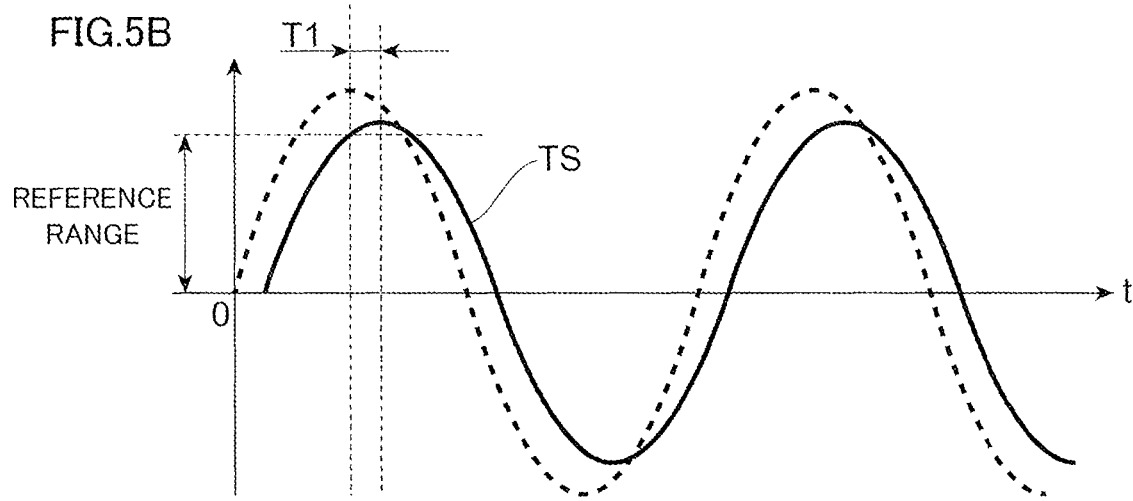
FIGS. 5B and 5C each depict an example of a torque detection signal output from the torque sensor.
Figure 5C:
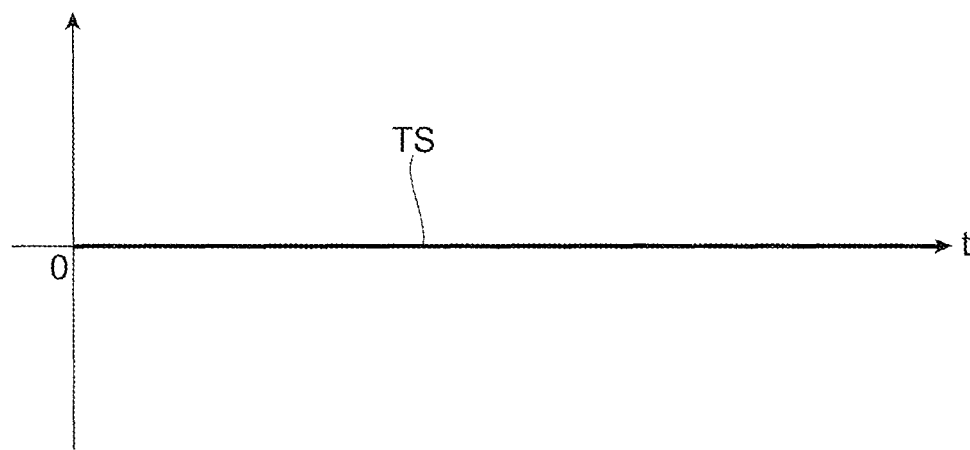

FIG. 5A depicts the target current It during the at-failure control being executed. FIGS. 5B and 5C each depict an example of the torque detection signal TS output from the torque sensors 203. FIG. 5A exemplarily shows the case where the temporary target current Itf is zero during the at-failure control, namely the case where the target current It is equal to the failure detection current If (forced vibration generating current) during the at-failure control. FIG. 5B shows an example of the torque detection signal TS from the torque sensors 203 when the torque sensors 203 reflect the periodic torsion of the pinion shaft 106 caused by the failure detection current If (forced vibration generating current). FIG. 5C shows an example of the torque detection signal TS from the torque sensors 203 when the torque sensors 203 do not reflect the periodic torsion of the pinion shaft 106 caused by the failure detection current If (forced vibration generating current).

Assume that a value of the failure detection current If at a given reference time point is set to a reference value H0 by the failure detection current determination unit 28. When a value of the torque detection signal TS from the torque sensors 203 after a lapse of a predetermined period T1 starting from the reference time point is out of a reference range, the torque detection signal TS is considered reflecting the torsion of the pinion shaft 106 caused by the failure detection current If (forced vibration generating current). In that case, the failure diagnosis unit 83 determines that the torque sensors 203 are working properly. On the other hand, when a value of the torque detection signal TS after a lapse of the predetermined period T1 is within the reference range, the torque detection signal TS is considered not reflecting the torsion of the pinion shaft 106 caused by the failure detection current If (forced vibration generating current). In that case, the failure diagnosis unit 83 determines that the torque sensors 203 are having failure. The reference value If0 of the failure detection current If may be for example a predetermined value. Also, the reference range may be varied according to the vehicle speed Vc. Alternatively, the reference range may be varied according to a steering angular velocity.

With a smaller transfer coefficient of the driving torque from the electric motor 110 to the pinion shaft 106, which is determined by factors including mass of the deceleration mechanism 111, the pinion shaft 106 and the rack shaft 105, the torsion of the pinion shaft 106 more hardly occurs. Thus, with a smaller transfer coefficient, the torque detection signal TS from the torque sensor 203 becomes smaller. In view of these facts, the reference range may be varied according to the transfer coefficient, such as narrowing the reference range with a smaller transfer coefficient.

Also, with a smaller transfer coefficient, it takes a longer time for the driving torque of the electric motor 110 to be transmitted to the torsion of the pinion shaft 106 (i.e., a response time becomes longer). In view of this, the predetermined period T1 may be varied according to the transfer coefficient, such as lengthening the predetermined period T1 with a smaller transfer coefficient. However, the predetermined period T1 may be defined in advance.

A description will now be given of procedures of an assist control process executed by the controller 10, with reference to a flowchart.

FIG. 6 is a flowchart of an assist control process executed by the controller 10.

The controller 10 executes this assist control process for e.g., every predetermined period (e.g., 1 millisecond).

The controller 10 determines whether the torque detection device 200 is having failure (S601). This determination is made through the aforementioned failure diagnosis by the failure diagnosis unit 83. If the torque detection device 200 is not having failure (No in S601), the controller 10 executes the aforementioned normal control (S602).

On the other hand, if the torque detection device 200 is having failure (Yes in S601), the controller 10 determines the forced vibration generating current as the failure detection current If in order to identify which one of the first torque sensor 201 and the second torque sensor 202 is having failure (S603). Then, the controller 10 determines whether the first torque detection signal TS1 from the first torque sensor 201 is reflecting the periodic torsion of the pinion shaft 106 caused by the failure detection current If (forced vibration generating current) (S604). If the determination is positive (Yes in S604), the controller 10 determines that the second torque sensor 202 is having failure (S605), and turns on a second torque sensor failure flag (S606) that is turned on upon determination that the second torque sensor 202 is having failure.

On the other hand, if the first torque detection signal TS1 from the first torque sensor 201 is not reflecting the periodic torsion of the pinion shaft 106 caused by the forced vibration generating current (No in S604), the controller 10 determines that the first torque sensor 201 is having failure (S607), and turns on a first torque sensor failure flag (S608) that is turned on upon determination that the first torque sensor 201 is having failure.

A description will now be given of procedures of a control process executed by the controller 10 in the event of failure of the torque sensor.

Figure 7:
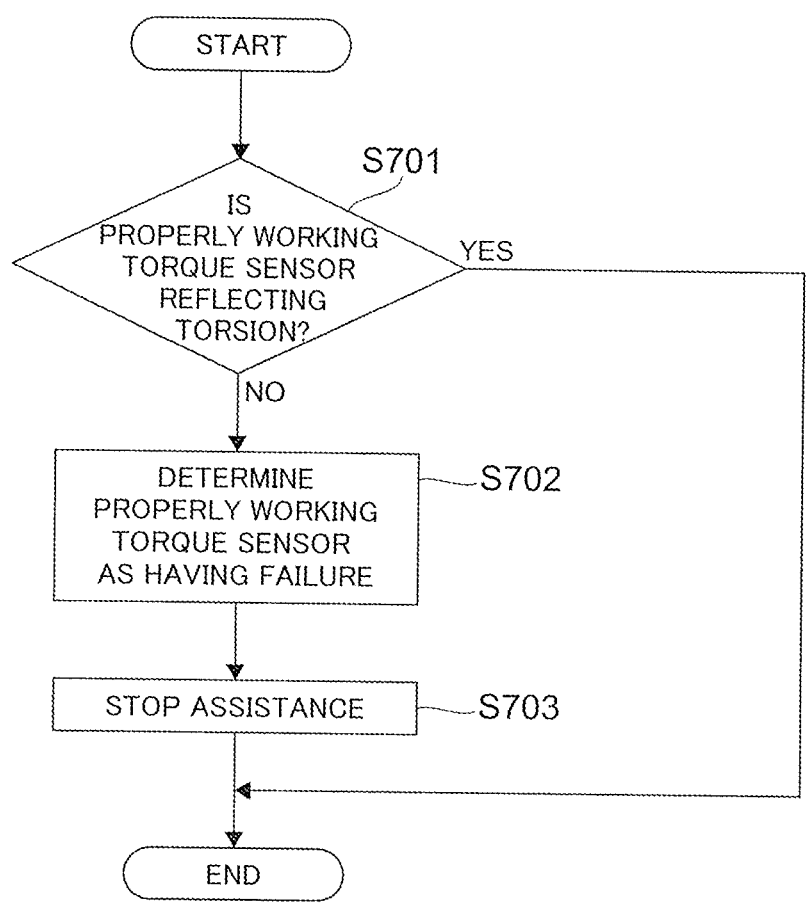
FIG. 7 is a flowchart of a control process executed by the controller in the event of failure of the torque sensor.

FIG. 7 is a flowchart of a control process executed by the controller 10 in the event of failure of the torque sensor.

With the first torque sensor failure flag or the second torque sensor failure flag turned on, the controller 10 executes this control process for e.g., every predetermined period (e.g., 1 millisecond).

The controller 10 determines whether the torque detection signal TS from one of the torque sensors 203 considered working properly (when the first torque sensor failure flag has been turned on, it is the second torque sensor 202, and when the second torque sensor failure flag has been turned on, it is the first torque sensor 201) is reflecting the periodic torsion of the pinion shaft 106 caused by the failure detection current If (forced vibration generating current) (S701). If the determination is positive (Yes in S701), the controller 10 ends the process.

If the determination is negative (No in S701), the controller 10 determines that the one of the torque sensors 203 considered working properly is having failure (S702). Now that both of the first torque sensor 201 and the second torque sensor 202 are having failure, the controller 10 stops driving of the electric motor 110 to stop assistance (S703).

In the above embodiment, with the forced vibration generating current being determined as the failure detection current If by the failure detection current determination unit 28, when the torque detection signal TS from any one of the torque sensors 203 is not reflecting the periodic torsion of the pinion shaft 106 caused by the failure detection current If (forced vibration generating current), the controller 10 (the failure diagnosis unit 83) determines that that torque sensor is having failure (e.g., S605, S607, and S702). The present invention is, however, not particularly limited to this embodiment. For example, the controller 10 (the failure diagnosis unit 83) may determine that, when the torque detection signal TS from any one of the torque sensors 203 is not reflecting the periodic torsion of the pinion shaft caused by the failure detection current If (forced vibration generating current) over a predetermined period (e.g., one second), that torque sensor is having failure. Alternatively, the controller 10 (the failure diagnosis unit 83) may determine that the sensor is having failure when that torque sensor is not reflecting the periodic torsion over the predetermined period in predetermined consecutive times (e.g., three times).

As described above, the steering apparatus 100 according the first embodiment includes the torque detection device 200 as an example of the torque detection unit to detect the steering torque T, and the failure diagnosis unit 83 as an example of the failure detection unit to detect failure of the torque detection device 200. The steering apparatus 100 further includes the target current calculation unit 20 as an example of the controller. In response to detection of failure of the torque detection device 200 by the failure diagnosis unit 83, the target current calculation unit 20 controls driving of the motor such that the motor outputs continuous torque. The continuous torque continuously generates torque that, as an example of the torque detectable by at least one of the torque sensors 203 when working properly, induces periodic torsion of the pinion shaft 106 caused by the failure detection current If (forced vibration generating current).

The controller 10 including the failure diagnosis unit 83 and the target current calculation unit 20 is an example of the failure detection device to detect failure of the torque detection device 200.

In the above configured steering apparatus 100 of the first embodiment, in the event of failure of the torque detection device 200 (in the event of failure of the first torque sensor 201 or the second torque sensor 202), the failure detection current determination unit 28 determines the forced vibration generating current as the failure detection current If, and the failure diagnosis unit 83 performs failure diagnosis on the basis of the torque detection signal TS from the torque sensors 203. This allows the steering apparatus 100 to identify which one of the first torque sensor 201 and the second torque sensor 202 is having failure. After identification of which one of the torque sensors is having failure, it is also possible to determine whether the other of the torque sensors, which is considered working properly, is having failure. In other words, even with one torque sensor that is considered working properly, it is possible to determine that this torque sensor does work properly. Thus, the torque detection signal TS from this properly working torque sensor is reliable. In this way, even when one of the first torque sensor 201 and the second torque sensor 202 is having failure, the steering apparatus 100 of the first embodiment can continue assistance control of the electric motor 110 on the basis of the torque detection signal TS from the other of the two torque sensors that is working properly. As a result, this configuration allows to more effectively reduce burden on the driver, as compared to configurations that require halt of the assistance control in the event of failure of one of the two torque sensors or that perform assistance control on the basis of a steering angle θs.

The failure detection current determination unit 28 controls the electric motor 110 such that the electric motor 110 continuously outputs the torque that induces the periodic torsion of the pinion shaft 106. This means that torque transmitted to the steering wheel 101 is also continuous. This delivers a better steering feeling than when torque generated in the steering wheel 101 is intermittent.

In the above configured steering apparatus 100 of the first embodiment, the failure detection current determination unit 28 may set the frequency of the forced vibration generating current, which is the failure detection current If, to 5 Hz or more. Setting the frequency of the forced vibration generating current to 5 Hz or more means that the steering wheel 101 vibrates at the frequency of 5 Hz or more in response to the periodic torsion of the pinion shaft 106, which is caused by the driving torque of the electric motor 110 corresponding to the failure detection current if (forced vibration generating current). When the steering wheel 101 vibrates at the frequency of 5 Hz or more, the driver holding the steering wheel 101 can feel the vibrations of the steering wheel 101. This allows the driver to recognize that the torque detection device 200 is having failure.

In other words, in the event of failure of the torque detection device 200, the failure detection current determination unit 28 determines the forced vibration generating current at the frequency of 5 Hz or more to be the failure detection current If, and thus the controller 10 of the present embodiment allows the driver to feel the vibrations of the steering wheel 101 and hence recognize the failure of the torque detection device 200. That is, in the event of failure of the torque detection device 200, the controller 10 of the present embodiment can inform the driver of that failure using the vibrations of the steering wheel 101.

The frequency of the forced vibration generating current is preferably 30 Hz or less because higher frequency vibrations of the steering wheel 101 may give an uncomfortable steering feeling.

Such adverse effect on the steering wheel, however, can be smaller with a smaller amplitude of vibrations of the steering wheel 101 caused by the failure detection current If (forced vibration generating current). Thus, the frequency may be more than 30 Hz when the amplitude of the forced vibration generating current is small. With the vibrations of the electric motor 110 caused by the failure detection current If (forced vibration generating current) having a frequency of more than 20 Hz, the driver can notice sounds as they occur. This allows the driver to recognize the failure of the torque detection device 200 from the sounds.

The frequency of the forced vibration generating current is preferably 7000 Hz (7 kHz) or less because higher frequency vibrations of the steering wheel 101 may generate unpleasant sounds. More preferably, the frequency of the forced vibration generating current is 4000 Hz (4 kHz) or less.

If the target current calculation unit 20 calculates the target current It for e.g., every 1 millisecond, the target current It can be the sum of the target current It and the forced vibration generating current, which periodically changes between positive and negative values at 500 Hz. When using the forced vibration generating current at the frequency of 7000 Hz (7 kHz), the target current calculation unit 20 may calculate the target current It for every 0.07 milliseconds.

In the above embodiment, in response to the notification from the output unit 80 that both of the first torque sensor 201 and the second torque sensor 202 are having failure, the final target current determination unit 29 determines the target current It to be zero. The present invention is, however, not limited to this embodiment. For example, in response to the notification from the output unit 80 that both of the first torque sensor 201 and the second torque sensor 202 are having failure, the final target current determination unit 29 may gradually reduce the target current It from its last value to zero.

Alternatively, in response to the notification from the output unit 80 that both of the first torque sensor 201 and the second torque sensor 202 are having failure, the final target current determination unit 29 may calculate the target current It on the basis of the steering angle θs calculated by a steering angle calculation unit.

Second Embodiment

The steering apparatus 100 of the second embodiment is different from the steering apparatus 100 of the first embodiment in that the failure diagnosis unit 83 of the second embodiment uses a different failure diagnosis method to determine whether the torque sensors 203 are reflecting torsion of the pinion shaft 106 caused by the failure detection current If (forced vibration generating current), namely whether at least one of the torque sensors are having failure. This difference from the first embodiment will be explained below.

Figure 8:
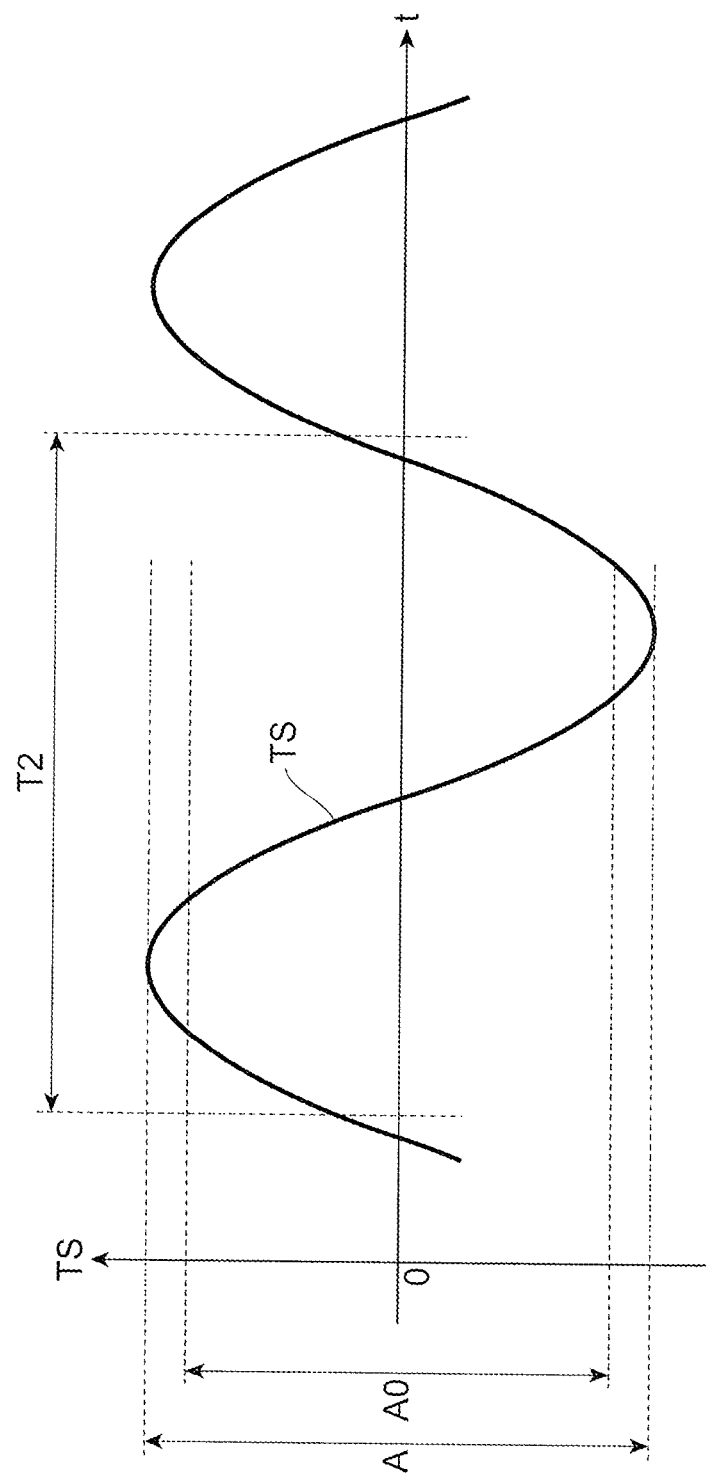
FIG. 8 depicts a failure diagnosis method according to the second embodiment.

FIG. 8 depicts a failure diagnosis method according to the second embodiment.

The failure diagnosis unit 83 of the second embodiment diagnoses failure of the torque sensor on the basis of an amplitude A of the torque detection signal TS output from the torque sensor during a predetermined reference period T2. For example, when the amplitude A of the torque detection signal TS during the reference period T2 is equal to or higher than a predetermined reference amplitude AO, the failure diagnosis unit 83 may determine that the torque sensor is working properly, and when the amplitude A of the torque detection signal TS during the reference period T2 is lower than the reference amplitude AO, the failure diagnosis unit 83 may determine that the torque sensor is having failure.

The torque detection signal TS from the torque sensor increases with decrease in the vehicle speed Vc. In view of this, in executing diagnosis based on the amplitude A of the torque detection signal TS, it is preferable that the reference amplitude AO be varied according to the vehicle speed Vc, such as by enlarging the reference amplitude AO with decrease in the vehicle speed Vc. Also, the torque detection signal TS from the torque sensor decreases with decrease in the transfer coefficient. In view of this, it is preferable that the reference amplitude AO be varied according to the transfer coefficient, such as by narrowing the reference amplitude AO with decrease in the transfer coefficient. The reference amplitude AO may, however, be defined in advance.

Third Embodiment

The steering apparatus 100 of the third embodiment is different from the steering apparatus 100 of the first embodiment in that the failure diagnosis unit 83 of the third embodiment uses a different failure diagnosis method. This difference from the first embodiment will be explained below.

Figure 9:
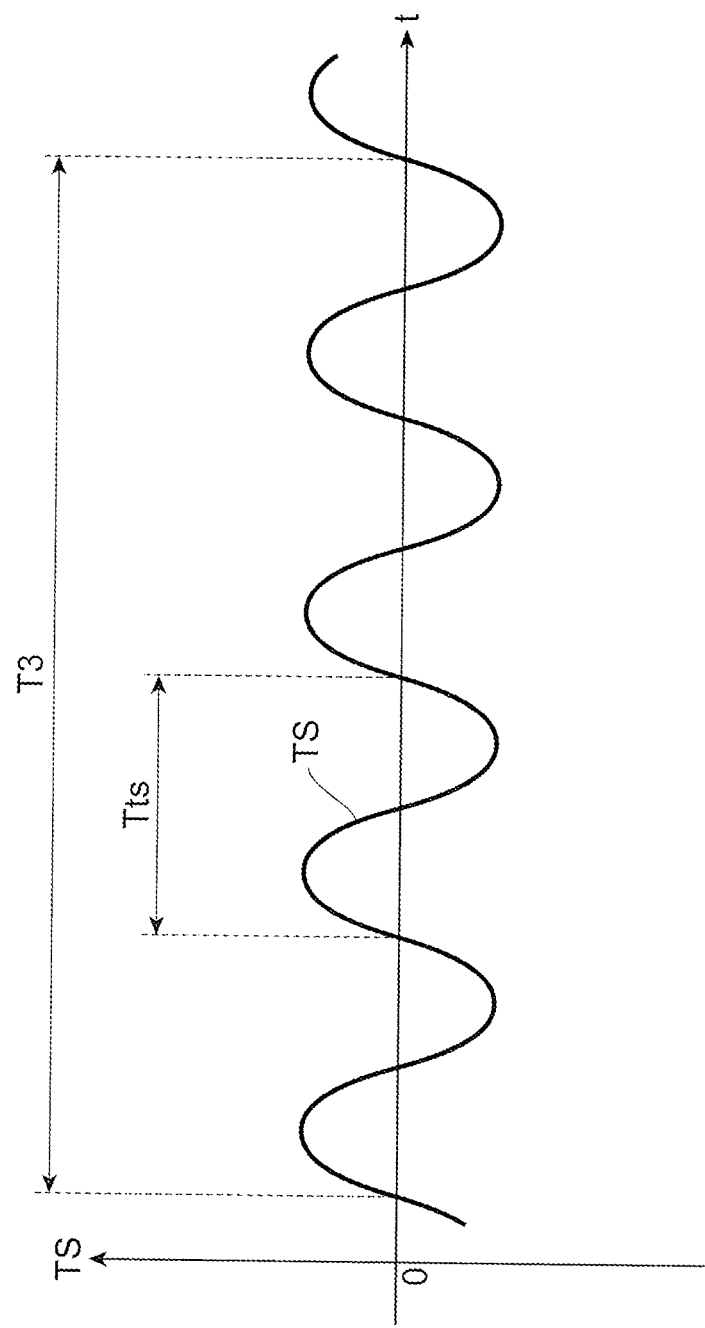
FIG. 9 depicts a failure diagnosis method according to the third embodiment.

FIG. 9 depicts a failure diagnosis method according to the third embodiment.

The failure diagnosis unit 83 according to the third embodiment diagnoses failure of the torque sensor on the basis of frequency f (=1/Tts) of the torque detection signal TS output from the torque sensor during a predetermined reference period T3. For example, when the frequency f of the torque detection signal TS during the reference period T3 is equal to or higher than a predetermined reference frequency, the failure diagnosis unit 83 may determine that the torque sensor is working properly, and when the frequency f of the torque detection signal TS during the reference period T3 is lower than the reference frequency, the failure diagnosis unit 83 may determine that the torque sensor is having failure.

Response of the torque detection signal TS from the torque sensor becomes slower with decrease in the transfer coefficient. In view of this, in diagnosing failure of the torque sensor on the basis of the frequency f of the torque detection signal TS, it is preferable that the reference frequency be varied according to the transfer coefficient, such as by lowering the reference frequency with decrease in the transfer coefficient. The reference frequency may, however, be defined in advance.

Fourth Embodiment

The steering apparatus 100 of the fourth embodiment is different from the steering apparatus 100 of the first embodiment in that the forced vibration generating current determined by the failure detection current determination unit 28 has a different waveform. This difference from the first embodiment will be explained below.

The forced vibration generating current to induce vibrations of the electric motor 110 is not limited to a sinusoidal waveform in the above first embodiment as long as the forced vibration generating current periodically varies between positive and negative values.

Figure 10A:
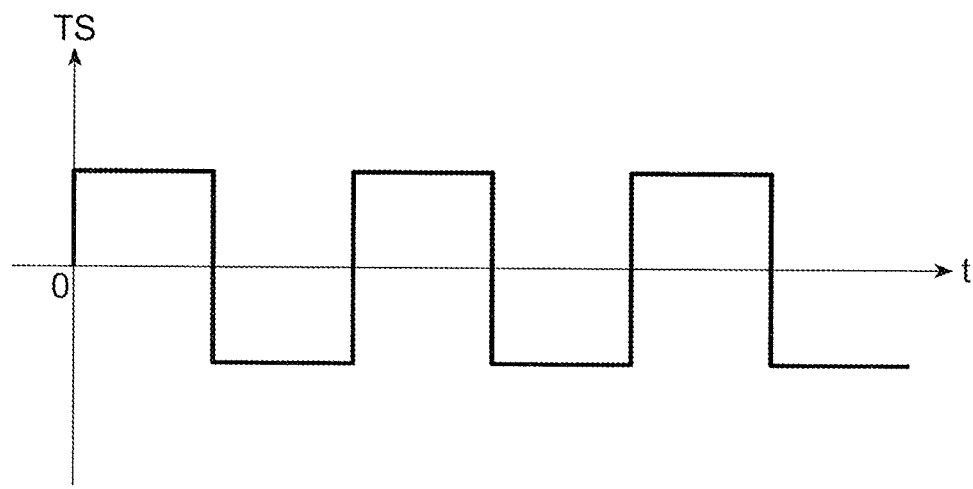
FIGS. 10A to 10C each depict another example of a waveform of a forced vibration generating current.
Figure 10B:
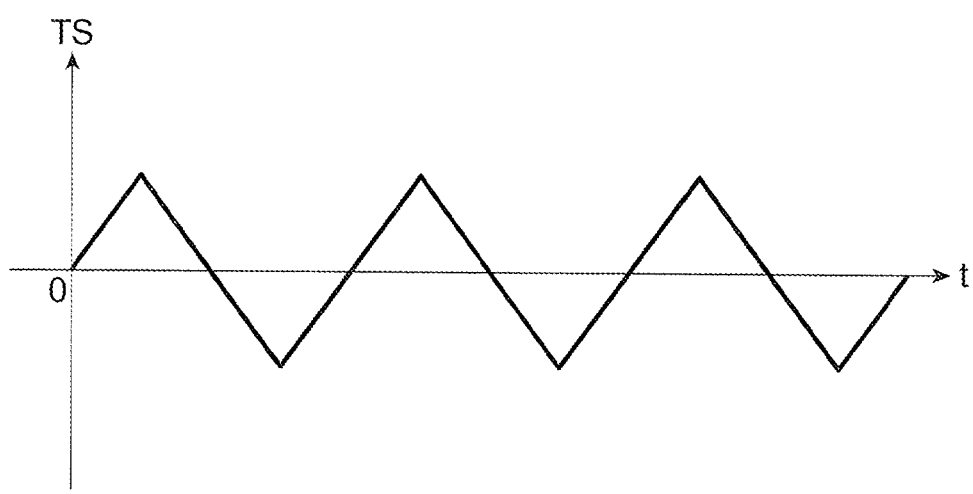
Figure 10C:
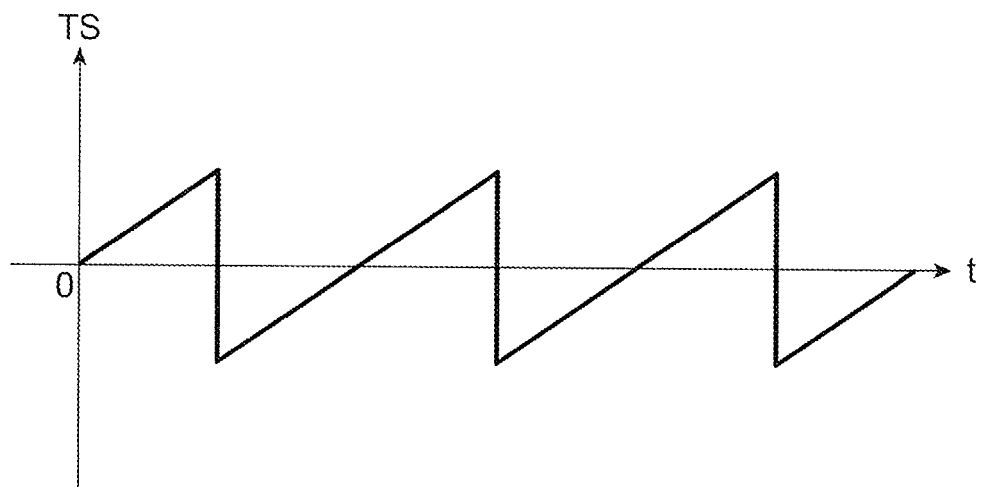

FIGS. 10A to 10C each depict another example of a waveform of the forced vibration generating current.

The forced vibration generating current to induce vibrations of the electric motor 110 may have a rectangular waveform as shown in FIG. 10A.

Alternatively, the forced vibration generating current may have a triangular waveform as shown in FIG. 10B.

Still alternatively, the forced vibration generating current may have a sawtooth waveform as shown in FIG. 10C.

With the forced vibration generating current having any one of the waveforms shown in FIGS. 10A to 10C, the failure diagnosis unit 83 can accurately determine, on the basis of the torque detection signal TS from the torque sensor, whether the torque detection signal TS is reflecting the torsion of the pinion shaft 106 caused by this forced vibration generating current (i.e., whether the torque sensor is having failure).

Fifth Embodiment

The steering apparatus 100 of the fifth embodiment has a function whereby the controller 10 changes the way of notifying the driver of failure of the torque detection device 200 depending on how much time has elapsed since the failure of the torque detection device 200 (i.e., since the detection of the failure of the torque detection device 200 by the failure diagnosis unit 83).

In notifying the driver with vibrations of the steering wheel 101 that the torque detection device 200 is having failure, the controller 10 may enhance the vibrations once a predetermined time has elapsed since the failure of the torque detection device 200. Enhancing the vibrations allows to more accurately inform the driver of the failure. To enhance the vibrations, the controller 10 may, for example, enlarge the amplitude of the failure detection current If (forced vibration generating current). Also, the vibrations may be enhanced by lowering the frequency of the failure detection current If (forced vibration generating current).

Alternatively, in notifying the driver with the vibrations of the steering wheel 101 that the torque detection device 200 is having failure, the controller 10 may enhance the vibrations greater with the lapse of time after the failure of the torque detection device 200.

In notifying the driver with sounds of vibrations of the electric motor 110 that the torque detection device 200 is having failure, the controller 10 may enhance the sounds once a predetermined time has elapsed since the failure of the torque detection device 200. Enhancing the sounds allows to more accurately inform the driver of the failure. To enhance the sounds, the controller 10 may, for example, enlarge the amplitude of the failure detection current If (forced vibration generating current).

Alternatively, in notifying the driver with the sounds of vibrations of the electric motor 110 that the torque detection device 200 is having failure, the controller 10 may enhance the sounds greater with the lapse of time after the failure of the torque detection device 200.

Features of the steering apparatus 100 of the first to the fifth embodiments may be combined with each other.

The torque detection device 200 of the first to the fifth embodiments includes two torque sensors, but the number of torque sensors is not limited to two. With three or more torque sensors too, the aforementioned controller 10 can identify which one of the three or more torque sensors is having failure, and also determine that, even with only one torque sensor working properly, this torque sensor does work properly. Also, when the torque detection device 200 has one torque sensor, the aforementioned controller 10 can determine that this torque sensor is working properly.

REFERENCE SIGNS LIST

10 Controller
20 Target current calculation unit
28 Failure detection current determination unit
80 Output unit
83 Failure diagnosis unit
200 Torque detection device 201 First torque sensor
202 Second torque sensor

The invention claimed is:

1. A failure detection device comprising:
a failure detection unit configured to detect failure of a torque detection unit, the torque detection unit detecting torque applied to a rotary shaft with a plurality of torque sensors; and
a controller configured to control drive of a motor such that the motor outputs continuous torque in an event that the failure detection unit detects failure of the torque detection unit, the continuous torque continuously generating torque that is, if at least one of the plurality of torque sensors is working properly, detectable by the at least one of the plurality of torque sensors, wherein
the controller controls drive of the motor so as to inform the failure of the torque detection unit with vibrations caused by the continuous torque so that vibrations are given to a steering wheel of a vehicle, and
the controller sets frequency of the vibrations caused by the continuous torque in a range from 5 Hz to 7 kHz.

2. The failure detection device according to claim 1, wherein, in an event that the controller controls drive of the motor such that the motor outputs the continuous torque, the failure detection unit detects which one of the plurality of torque sensors of the torque detection unit is having failure.

3. The failure detection device according to claim 2, wherein, in an event that the failure detection unit detects failure of one of two torque sensors of the torque detection unit, the failure detection unit detects whether the other one of the two torque sensors is having failure, on a basis of the controller controlling drive of the motor such that the motor outputs the continuous torque.

4. The failure detection device according to claim 2, wherein the controller controls drive of the motor so as to inform the failure of the torque detection unit with sounds of vibrations caused by the continuous torque.

5. The failure detection device according to claim 2, wherein the controller gives a sinusoidal waveform to a current supplied to the motor to cause the motor to output the continuous torque.

6. The failure detection device according to claim 2, wherein the controller gives any one of a rectangular waveform, a triangular waveform, and a sawtooth waveform to a current supplied to the motor to cause the motor to output the continuous torque.

7. The failure detection device according to claim 1, wherein, in an event that the failure detection unit detects failure of one of two torque sensors of the torque detection unit, the failure detection unit detects whether the other one of the two torque sensors is having failure, on a basis of the controller controlling drive of the motor such that the motor outputs the continuous torque.

8. The failure detection device according to claim 1, wherein the controller controls drive of the motor so as to inform the failure of the torque detection unit with sounds of vibrations caused by the continuous torque.

9. The failure detection device according to claim 8, wherein the controller sets frequency of the sounds of vibrations caused by the continuous torque in a range from 30 Hz to 4 kHz.

10. The failure detection device according to claim 1, wherein the controller gives a sinusoidal waveform to a current supplied to the motor to cause the motor to output the continuous torque.

11. The failure detection device according to claim 1, wherein the controller gives any one of a rectangular waveform, a triangular waveform, and a sawtooth waveform to a current supplied to the motor to cause the motor to output the continuous torque.

12. The failure detection according to claim 1, wherein the controller sets frequency of the vibrations given to the steering wheel on the basis of the continuous torque in a range from 5 Hz to 30 Hz.

13. The failure detection device according to claim 1, wherein the controller varies amplitude of vibrations caused by the continuous torque depending on a lapse of time after detection of the failure of the torque detection unit by the failure detection unit.

14. The failure detection device according to claim 1, wherein the controller lowers frequency of vibrations caused by the continuous torque depending on a lapse of time after detection of the failure of the torque detection unit by the failure detection unit.

15. The failure detection device according to claim 1, wherein, if amplitude of vibrations caused by the continuous torque and detected by at least one of the torque sensors is below a reference amplitude, the failure detection unit determines that the at least one of the torque sensors is having failure, and
the failure detection unit makes the reference amplitude variable.

16. The failure detection device according to claim 1, wherein, if frequency of vibrations caused by the continuous torque and detected by at least one of the torque sensors is below a reference frequency, the failure detection unit determines that the at least one of the torque sensors is having failure, and
the failure detection unit makes the reference frequency variable.

17. An electric power steering apparatus comprising:
a torque detection unit configured to detect steering torque with a plurality of torque sensors;
a failure detection unit configured to detect failure of the torque detection unit; and
a controller configured to control drive of a motor such that the motor outputs continuous torque in an event that the failure detection unit detects failure of the torque detection unit, the continuous torque continuously generating torque that is, if at least one of the plurality of torque sensors is working properly, detectable by the at least one of the plurality of torque sensors, wherein
the controller controls drive of the motor so as to inform the failure of the torque detection unit with vibrations caused by the continuous torque so that vibrations are given to a steering wheel of a vehicle, and
the controller sets frequency of the vibrations caused by the continuous torque in a range from 5 Hz to 7 kHz.

18. A failure detection device comprising:
a controller configured to control drive of a motor such that the motor outputs continuous torque, the continuous torque continuously generating torque detectable by a torque sensor configured to detect torque applied to a rotary shaft; and
a failure detection unit configured to detect failure of the torque sensor on a basis of whether the torque sensor detects torque applied to the rotary shaft, the torque resulting from the continuous torque in an event that the controller controls drive of the motor such that the motor outputs the continuous torque, wherein the controller controls drive of the motor so as to inform the failure of the torque detection unit with vibrations caused by the continuous torque so that vibrations are given to a steering wheel of a vehicle, and the controller sets frequency of the vibrations caused by the continuous torque in a range from 5 Hz to 7 kHz.

* * * * *